United States Patent [19]

Karibe et al.

[11] Patent Number: 5,572,491

[45] Date of Patent: Nov. 5, 1996

[54] MAGNETO-OPTICAL RECORDING DEVICE CAPABLE OF RECORDING TWO MAGNETO-OPTICAL DISCS

[75] Inventors: Haruyuki Karibe; Ryuichi Asano, both of Kanagawa, Japan

[73] Assignee: Sony Corporation, Tokyo, Japan

[21] Appl. No.: 365,350

[22] Filed: Dec. 28, 1994

[30] Foreign Application Priority Data

Dec. 28, 1993 [JP] Japan ............................ 5-349798

[51] Int. Cl.⁶ ........................................ G11B 11/00
[52] U.S. Cl. ............................. 369/13; 360/114
[58] Field of Search ..................... 369/13, 14, 110, 369/44.37, 44.38, 32, 275.2; 360/114, 59, 103, 102

[56] References Cited

U.S. PATENT DOCUMENTS

| | | | |
|---|---|---|---|
| 5,202,880 | 4/1993 | Lee et al. | 369/275.2 |
| 5,237,547 | 8/1993 | Ohkuma et al. | 369/13 |
| 5,270,879 | 12/1993 | Shima et al. | 369/13 |
| 5,392,263 | 2/1995 | Watanabe et al. | 369/13 |
| 5,420,834 | 5/1995 | Finkelstein et al. | 369/13 |

FOREIGN PATENT DOCUMENTS

| | | | |
|---|---|---|---|
| 63-113839 | 5/1988 | Japan | 369/13 |
| 4-332940 | 11/1992 | Japan . | |

*Primary Examiner*—Tan Dinh
*Attorney, Agent, or Firm*—Limbach & Limbach LLP; Philip M. Shaw, Jr.

[57] ABSTRACT

A magneto-optical disc recording apparatus with a high mounting efficiency and shortened access time, wherein two magneto-optical disc media are disposed facing each other, only the outside of the two magneto-optical disc media being recordable and reproducible, auxiliary magnetic field application magnets are disposed between the two magneto-optical disc media, and the reproduction/recording heads and reproduction/erasure heads are affixed on the same bases which are mounted on a sled base, whereby it becomes possible to reduce the size of the plane of the sled base, dispose a large number of heads, and shorten the access time as well.

5 Claims, 13 Drawing Sheets

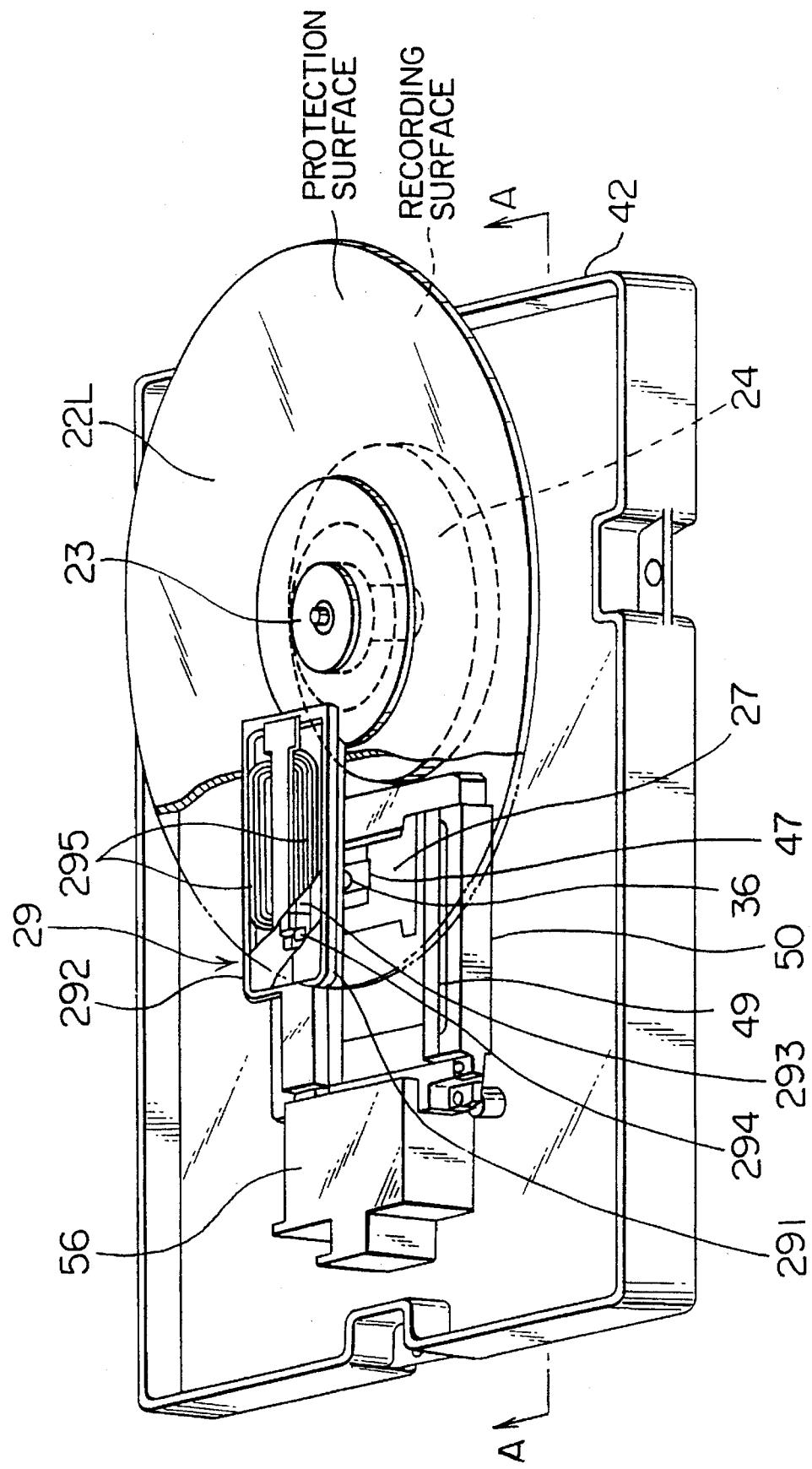

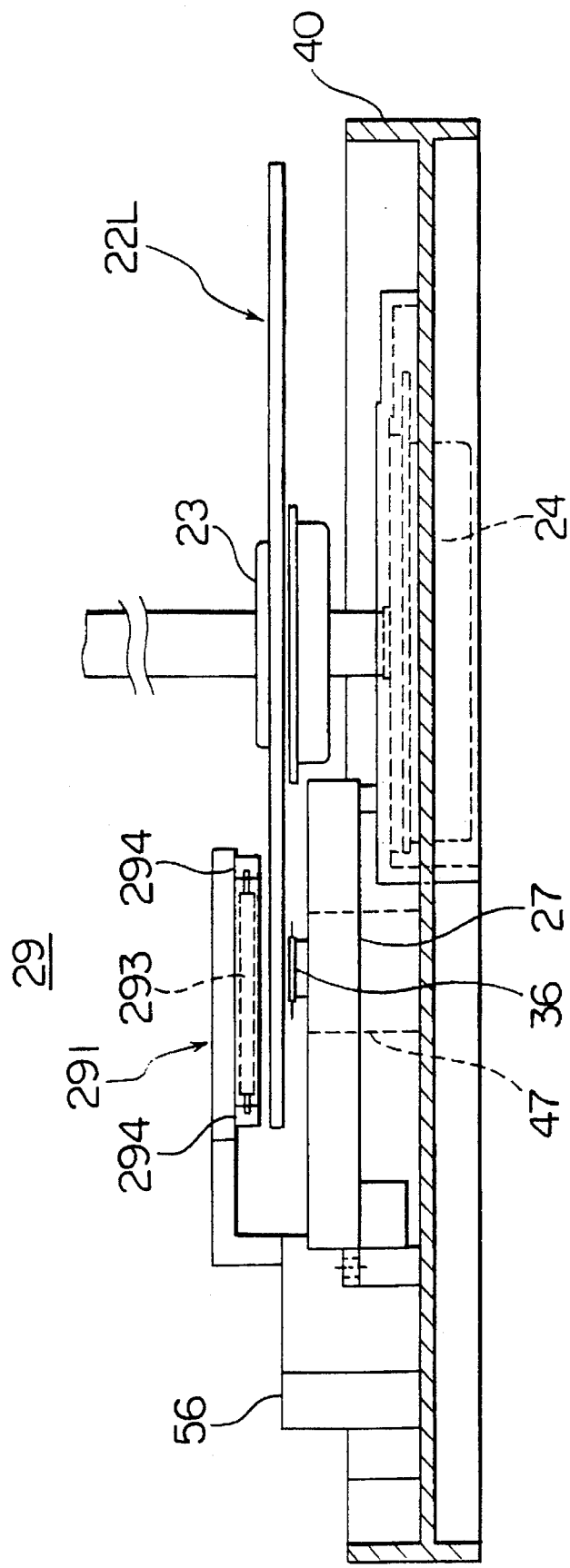

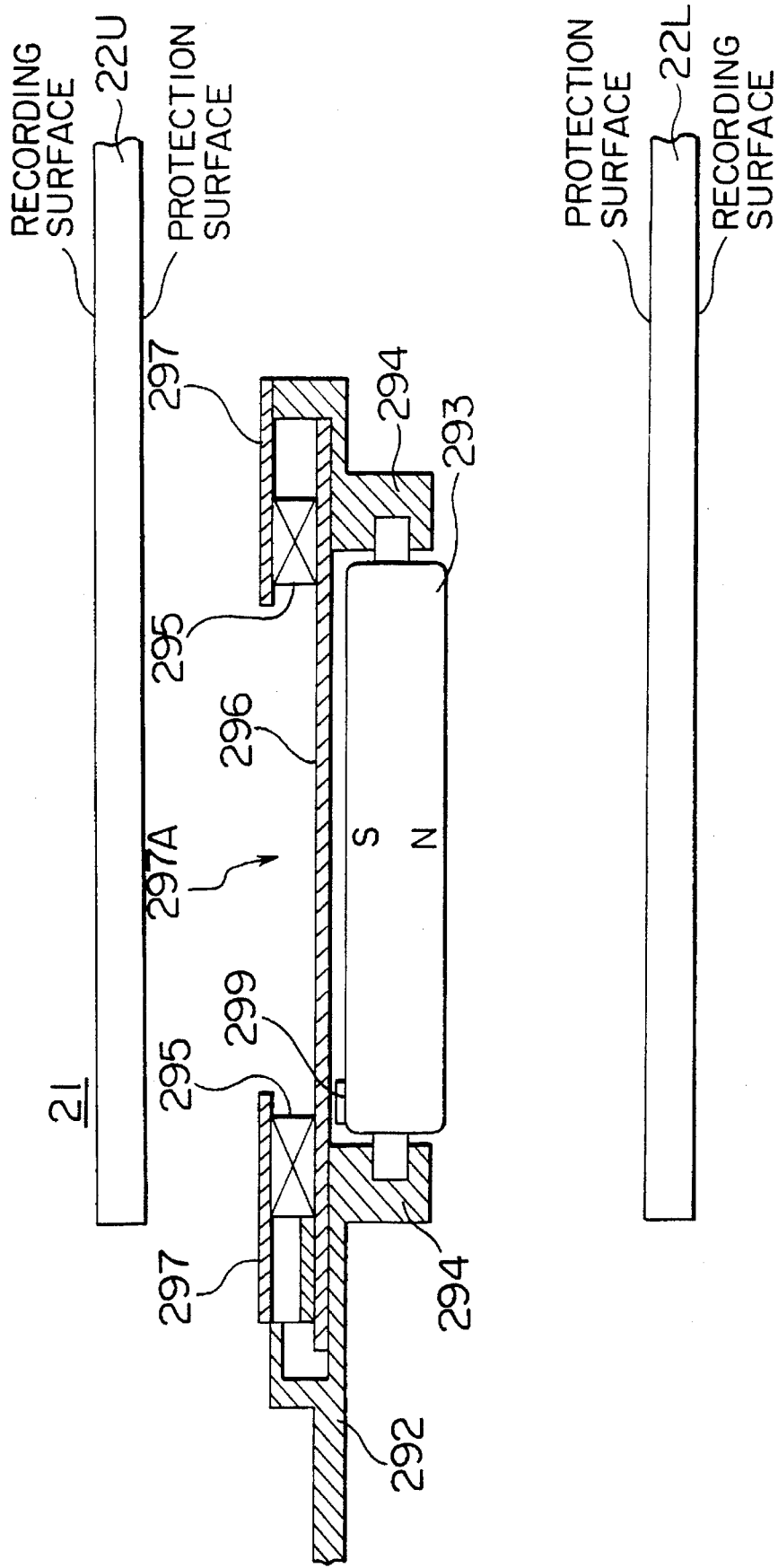

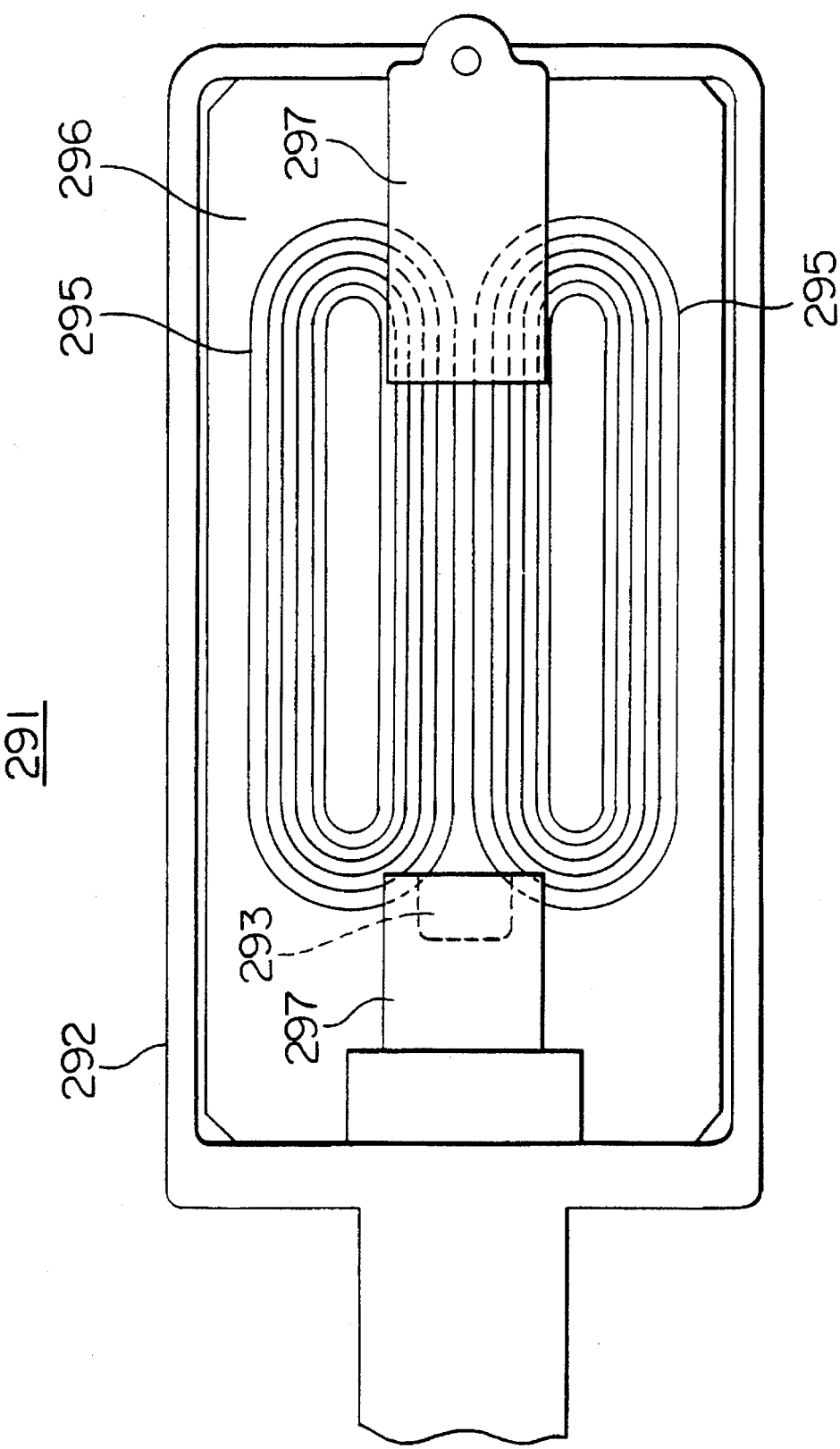

5,572,491

MAGNETO-OPTICAL RECORDING DEVICE CAPABLE OF RECORDING TWO MAGNETO-OPTICAL DISCS

BACKGROUND OF THE INVENTION

1. Field of the Invention

The present invention relates to a magneto-optical disc recording apparatus, more particularly to a magneto-optical disc recording apparatus of the optical modulation type using magneto-optical (MO) discs.

2. Description of the Related Art

The known magneto-optical disc recording apparatuses are of the optical modulation type and the magnetic field modulation type. Magneto-optical disc recording apparatuses of the optical modulation type include ones which use magneto-optical disc recording media of the overwrite type and ones which use magneto-optical disc recording media of the non-overwrite type. Here, an illustration will be given of a magneto-optical disc recording apparatus of the optical modulation type using a magneto-optical disc recording medium of the non-overwrite type and making simultaneous use of both sides.

One known method for improving the rate of data transfer of magneto-optical disc recording apparatuses is to use the two sides of a single magneto-optical disc recording medium and to provide optical pickups and auxiliary magnetic field applying means at each of the two sides of that medium.

A magneto-optical disc recording apparatus which uses a magneto-optical disc recording medium of the non-overwrite type, however, cannot perform an overwrite operation, and so, for example, uses an erasure head to once erase data from the magneto-optical disc recording medium before recording data on the medium. Accordingly, basically, a minimum of two heads are required at the top and bottom sides. To enable data to be recorded on a magneto-optical disc recording medium in the same processing time as with a magneto-optical disc recording apparatus of the overwrite type in a magneto-optical disc recording apparatus of the non-overwrite type, however, it is necessary to provide a reproduction/recording head and a reproduction/erasure head at each side of the magneto-optical disc recording medium and therefore necessary to provide a total of four heads (four optical pickups) at the top and bottom sides of the magneto-optical disc recording medium.

These heads may be arranged by the method of placing them facing each other in the diametrical direction of the magneto-optical disc and the method of placing them apart by 90 degrees or another angle. In the following example, an explanation will be made of a magneto-optical disc recording apparatus of the type where the heads are positioned facing each other in the diametrical direction of the magneto-optical disc so there is freedom in mounting the optical pickups and the coarse motion motor for the tracking direction.

As such magneto-optical disc apparatuses, examples shown in FIGS. 1 to 3 can be considered.

FIG. 1 is a perspective view of a first example of the related art. It shows a magneto-optical driver (magneto-optical disc recording apparatus) having members arranged facing each other in the diametrical direction of the magneto-optical disc recording medium, that is, placed 180 degrees apart, and using medium (magneto-optical disc recording medium) of the non-overwrite type.

The magneto-optical disc recording medium 1 of the non-overwrite type is of the double-sided recording type. The magneto-optical disc recording medium 1 is affixed to a turntable of a rotational member 2 having a shaft and a turntable and is made to turn by a spindle motor 3 connected to the shaft of the rotational member 2.

The magneto-optical disc recording apparatus shown in FIG. 1 is provided with four optical pickups. Four heads are provided in these optical pickups. These four heads include a reproduction/recording head 4 for the top side of the magneto-optical disc recording medium 1, a reproduction/erasure head 5 for the top side provided in the same plane as the head 4 in the horizontal direction at a position facing it in the diametrical direction of the magneto-optical disc recording medium 1, a reproduction/recording head 6 for the bottom side of the magneto-optical disc recording media 1, and a reproduction/erasure head 7 for the bottom side provided in the same plane of the head 6 in the horizontal direction at a position facing it in the diametrical direction of the magneto-optical disc recording media 1.

Referring to the construction of the reproduction/erasure head 5 as a representative case, the heads 4 to 7 are slidable in the diametrical direction of the magneto-optical disc recording medium 1 by the bearings 8 and shafts 9 and moved by the coarse motion motors 10 to access specific positions in the track direction of the magneto-optical disc recording medium. The four optical pickups provided with the four heads 4 to 7, the sliding parts, and the coarse motion motors 10 are affixed to four bases 11. These four bases 11 are arranged on a sled base 12.

These four optical pickups are provided with auxiliary magnetic field application magnets which apply magnetic fields to the magneto-optical disc recording medium 1 at positions facing the heads across the magneto-optical disc recording medium 1. For example, for the reproduction/recording head 6 and the reproduction/erasure head 7, as illustrated, magnets 13 are arranged as the auxiliary magnetic field application magnets above the magneto-optical disc recording medium 1. The magnets for application of auxiliary magnetic fields to the reproduction/recording head 4 and reproduction/ erasure head 5 are not illustrated due to restrictions of the drawing, but are positioned at the reverse side of the magneto-optical disc medium 1 below those heads.

when recording data on the top side of the magneto-optical disc recording medium 1 in the magneto-optical disc recording apparatus using a magneto-optical disc recording medium 1 of the non-overwrite type of FIG. 1, the data at the portion to be recorded is erased by the reproduction/erasure head 5 and then data is recorded at the portion erased by the head 5 by the reproduction/recording head 4 facing it in the horizontal direction (diametrical direction of magneto-optical disc recording medium 1). When recording data at the bottom side of the magneto-optical disc recording media 1, the portion where the data is to be recorded is erased by the reproduction/erasure head 7 and then data is recorded at that portion by the reproduction/recording head 6.

When reproducing data from the top side of the magneto-optical disc recording media 1, the reproduction/recording head 4 and reproduction/erasure head 5 are used, while when reproducing data at the bottom side of the magneto-optical disc recording media 1, the reproduction/recording head 6 and reproduction/erasure head 7 are used.

Note that in the case of the magnetic field modulation type, there is no need to provide erasure heads corresponding to the reproduction/erasure heads 5 and 7 shown in FIG. 1, so the number of heads can be halved from the above.

In the magneto-optical disc recording apparatus shown in FIG. 1, there is a single magneto-optical disc recording media 1, but since an auxiliary magnetic field applying means has to be provided for each optical pickup, four auxiliary magnetic field applying means, for example, permanent magnets, are required for recording and reproducing data on a single magneto-optical disc recording media and thus there is the problem of a relatively larger number of permanent magnets.

The four optical pickups provided with the reproduction/recording head 4, the reproduction/erasure head 5, the reproduction/recording head 6, and the reproduction/erasure head 7 are disposed at 90 degree intervals along the circumference of the magneto-optical disc recording medium 1, so a base 11 for supporting an optical pickup is required every 90 degrees, that is, in each direction. Accordingly, the sled base 12 ends up becoming larger in both the width direction and the depth direction and it is difficult to reduce the size of the magneto-optical disc recording apparatus.

As a second example, an explanation will be made of the magneto-optical disc recording apparatus referring to FIG. 2.

As illustrated in FIG. 2, there is considered a magneto-optical disc recording apparatus in which the heads 14 and 15 provided at the optical pickups for the top side of the magneto-optical disc recording media 1 are arranged at the same positions as the heads 16 and 17 provided at the optical pickups for the bottom side, respectively, except facing each other across the magneto-optical disc recording medium 1 in the vertical direction, that is, the head 14 faces the head 17 and the head 15 faces the head 16 at same positions across the magneto-optical disc medium 1 in the vertical direction.

In this example, the basic configuration of the magneto-optical disc recording apparatus is the same as that in FIG. 1. Only the positions of the optical systems are different. That is, the magneto-optical disc recording apparatus shown in FIG. 2 has, in addition to the magneto-optical disc recording medium 1, the rotational member 2 having the shaft and turntable, the bases 11, the sled base 12, etc., a spindle motor, bearings, shaft, coarse motion motors, auxiliary magnetic field application magnets, etc. in the same way as in FIG. 1, though not shown in FIG. 2.

In this magneto-optical disc recording apparatus, the portion where the data is to be recorded is erased by the top side optical pickup reproduction/erasure head 15, then data is written by the top side optical pickup reproduction/recording head 14 at the portion where the data was erased. In the same way, the portion where the data is to be recorded is erased by the bottom side reproduction/erasure head 17 and then data is written at the portion where the data was erased by the bottom side reproduction/recording head 16.

In this example, a plurality of auxiliary magnetic field application magnets must be provided in the respective heads 14 to 17. Such optical pickups, each functioning as both the auxiliary magnetic field application means and the optical system, can be realized by a method disclosed in Japanese Unexamined Patent Publication (Kokai) No. 4-332940, however, the construction of that magneto-optical disc recording apparatus ends up becoming complicated.

A third example will be explained referring to FIG. 3.

As illustrated in FIG. 3, another method for improving the rate of data transfer of a magneto-optical disc recording apparatus is to divide the magneto-optical disc recording medium 1 into an inner circumference area and an outer circumference area which are used independently and to make simultaneous use of a total of four top pickups and four bottom pickups. That is, a total of four heads are provided at the top side: the inner circumference reproduction/recording head 18, the inner circumference reproduction/erasure head 19, the outer circumference reproduction/recording head 20, and the outer circumference reproduction/erasure head 21. The same types of heads as the top side are provided at the bottom side of the magneto-optical disc recording medium 1 as well. Therefore, a total of eight optical pickups are mounted at the two sides. The auxiliary magnetic field application magnets are provided at locations facing these optical pickups across the magneto-optical disc recording medium 1.

In this example as well, in the same way as explained with reference to the magneto-optical disc recording apparatus of FIG. 2, the basic construction of the magneto-optical disc recording apparatus is the same as the magneto-optical disc recording apparatus shown in FIG. 1 with just the deployment of the optical systems being different.

In this magneto-optical disc recording apparatus, when recording data at the outer circumference area on the top side of the magneto-optical disc recording medium 1, the data of the portion to be recorded on is erased by the outer circumference reproduction/erasure head 21 and then data is written at the portion where the data was erased by the outer circumference reproduction/recording head 20. When recording data at the inner circumference portion of the top side of the magneto-optical disc recording medium 1, the portion where the data is to be recorded is erased by the inner circumference reproduction/erasure head 19 and then data is written on the portion where the data was erased by the inner circumference reproduction/recording head 18. Data is recorded on the outer circumference and inner circumference areas of the bottom side of the magneto-optical disc recording media 1 in the same way as the above.

The magneto-optical disc recording apparatus shown in FIG. 3 requires the provision, at the top side of the magneto-optical disc recording medium 1, of the inner circumference reproduction/recording head 18, the inner circumference reproduction/erasure head 19, the outer circumference reproduction/recording head 20, and the outer circumference reproduction/erasure head 21, or a total of four heads (or optical pickups), while requires the provision of four heads at the bottom side as well in the same way as above, so eight optical pickups had to be provided above and below for the two sides.

In a case where separate auxiliary magnetic field applying means and optical systems are required such as in the case of the magneto-optical disc recording apparatus shown in FIG. 1, it is not possible to arrange the optical pickups at 90 degree intervals from each other. There were great restrictions in dimensions in terms of structure and therefore the apparatus was difficult to realize.

SUMMARY OF THE INVENTION

An object of the present invention is to provide a magneto-optical disc recording apparatus which is simple in construction and enables a shorter access time.

According to a first aspect of the present invention, there is provided a magneto-optical disc recording apparatus including: a rotational member having a shaft and a turntable which are driven to rotate by a motor; first and second magneto-optical disc recording media each having a recording area on its side and which are affixed to the rotational member a predetermined distance apart along the axial direction of the shaft and with each one having a recording side being placed to face outside thereof; at least one magnetic field applying means disposed in the space between the first and second of magneto-optical disc recording media for applying a magnetic field to the pair of magneto-optical disc recording media; and at least two optical pickups each provided at a position facing of the one sides of the first and second magneto-optical disc recording media at areas corresponding to a position of the magnetic field applying means, respectively.

That is, two magneto-optical disc recording media on each of which only one recording side is formed are arranged so that their protective sides face each other, the magnetic field applying means is disposed in the space between them, and optical pickups are disposed at the outsides at the same positions above and below. As a result, it is possible to apply a magnetic field acting on the two upper and lower magneto-optical disc recording media by a single magnetic field applying means, so the number of the magnetic field applying means can be halved.

The recording and reproduction operations for the magneto-optical disc recording media are the same as in the past.

Preferably, a reproduction/erasure head is used to once erase the data recorded on the magneto-optical disc recording apparatus, then data is recorded at the erased position by a reproduction/recording head. The data is reproduced using a reproduction/recording head.

Preferably, further provision is made of a means for reversing the direction of the magnetic field of the magnetic field applying means between forward (north polarity) and reverse (south polarity).

More preferably, two magnetic field applying means are provided at different positions in the space and two optical pickups are provided at each position outside of the one sides of the first and second magneto-optical disc recording media corresponding to the two magnetic field applying means.

Preferably, the pair of the magnetic field applying means are provided at positions 180 degrees apart in the diametrical direction of the magneto-optical disc recording medium, the pair of pickups provided at upper position outside of the first and second magneto-optical disc recording media corresponding to the two magnetic field applying means, and the pair of pickups provided at lower position outside of the first and second magneto-optical disc recording media corresponding to the two magnetic field applying means.

BRIEF DESCRIPTION OF THE DRAWINGS

The above objects and features and other objects and features of the present invention will become clearer from the following detailed description of embodiments made with reference to the attached drawings, in which:

FIG. 6 is a perspective view illustrating the relationship between an auxiliary magnetic field application magnet for the lower magneto-optical disc medium and a bottom side reproduction/recording head (optical pickup);

FIG. 7 is a cross-sectional view along the line A—A of FIG. 6;

FIG. 8 is a view of the configuration of the auxiliary magnetic field generating unit of FIG. 7;

FIG. 9 is a plane view of the auxiliary magnetic field generating unit shown in FIG. 8;

DESCRIPTION OF THE PREFERRED EMBODIMENTS

Below, an explanation will be made of preferred embodiments of the magneto-optical disc recording apparatus of the present invention.

The preferred magneto-optical disc recording apparatus of the present invention is a magneto-optical disc recording apparatus of the optical modulation type which uses a non-overwrite type magneto-optical disc recording media. Since a magneto-optical disc recording apparatus using magneto-optical disc recording media of the non-overwrite type cannot carry out an overwrite operation, data must first be erased before other data is recorded. The magneto-optical disc recording apparatus of the present invention will be explained with reference to the case of the provision of separate erasure heads and recording heads so as to enable a processing speed equivalent to that of a magneto-optical disc recording apparatus of the overwrite type to be maintained even by a magneto-optical disc recording apparatus of the non-overwrite type.

First Embodiment

A first embodiment of the magneto-optical disc recording apparatus of the present invention (magneto-optical disc driver apparatus) will first be explained with reference to FIG. 4A, FIG. 4B, and FIGS. 5A to 5C.

Figure 4A:
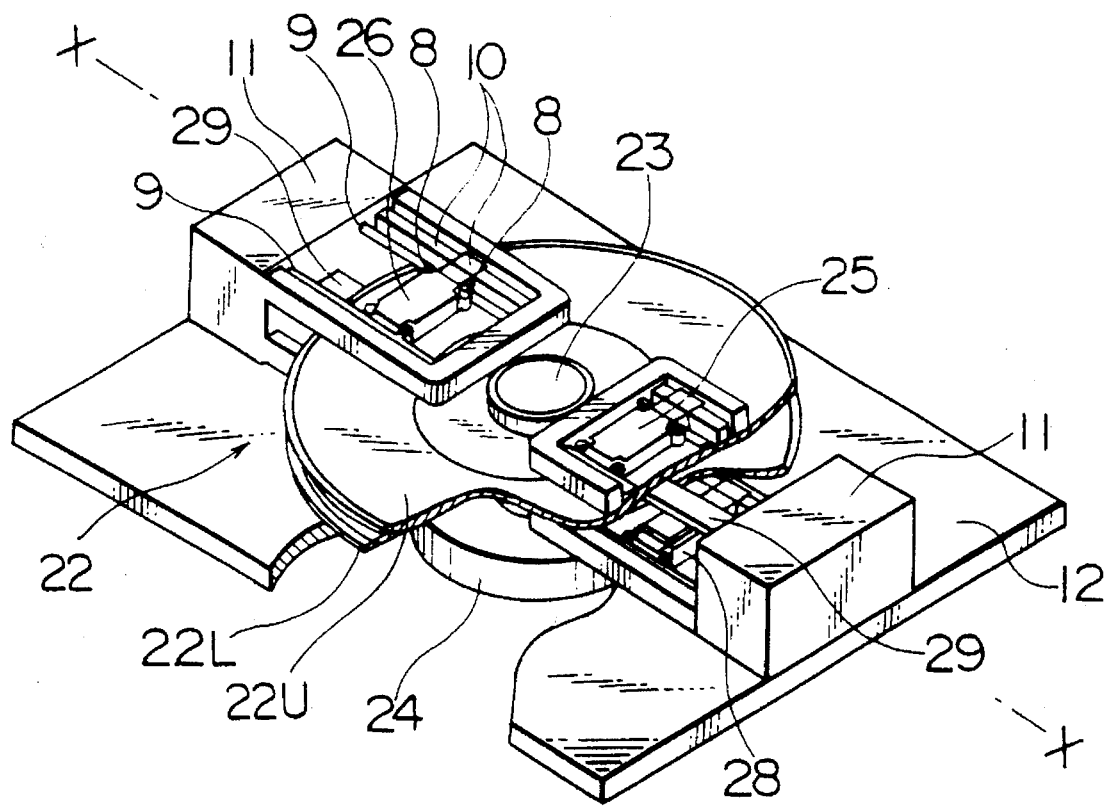
FIG. 4A is an overall perspective view of a drive unit of a magneto-optical disc recording apparatus of the first embodiment of the present invention and FIG. 4B is a cross-sectional view taken along a line X—X of FIG. 4A.
Figure 4B:
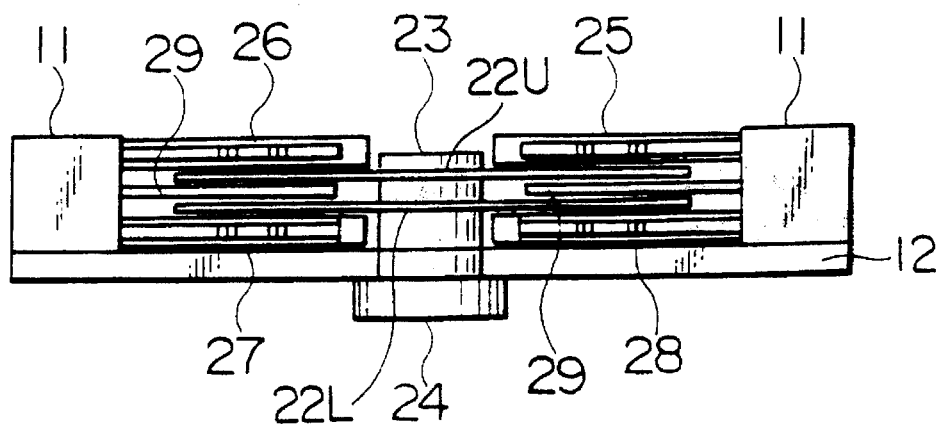
Figure 5A:
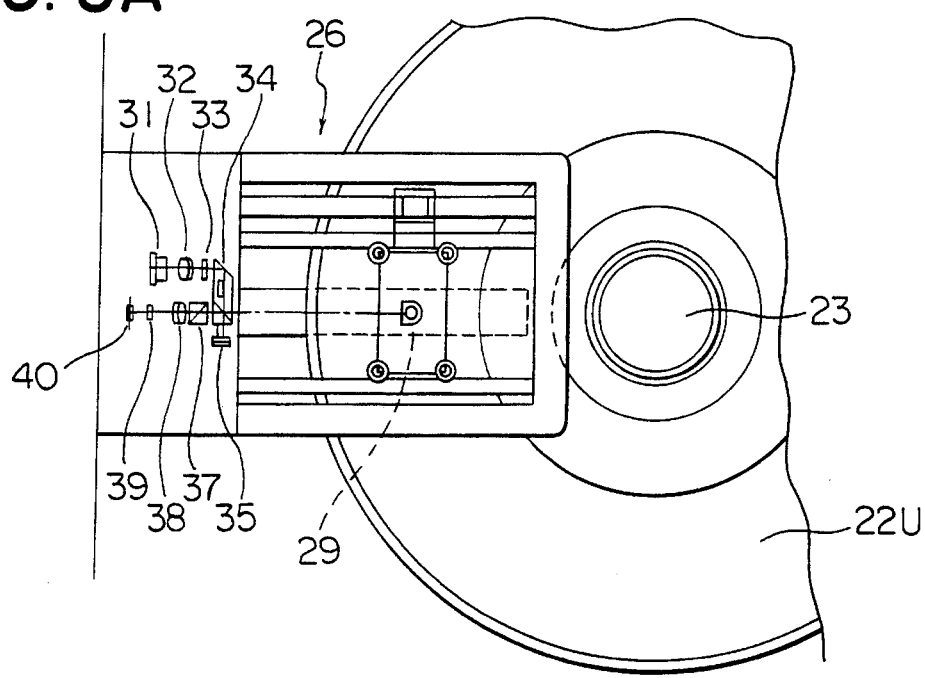
FIG. 5A is a top view of an optical pickup provided with a top side reproduction/erasure head in the magneto-optical disc recording apparatus illustrated in FIG. 4A.
Figure 5B:
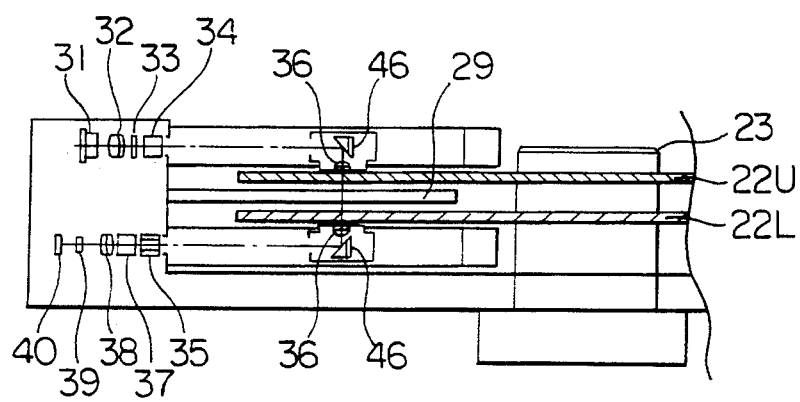
FIG. 5B is an enlarged side view, partly in section, of an optical system of an optical pickup corresponding to FIG. 4B.
Figure 5C:
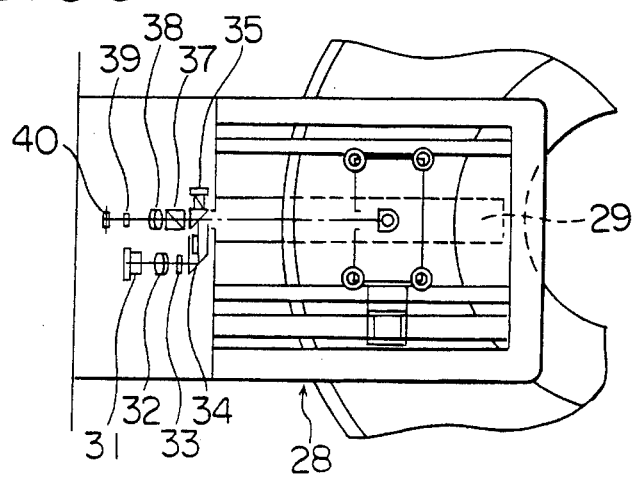
FIG. 5C is a bottom view of an optical pickup provided with a bottom side reproduction/recording head.

FIG. 4A is an overall perspective view of a drive unit of a magneto-optical disc driver apparatus of an embodiment of the present invention, while FIG. 4B is a cross-sectional view along the line X—X of FIG. 4A. FIG. 5A is a top view of an optical pickup provided with a top side reproduction/erasure head in the magneto-optical disc recording apparatus illustrated in FIG. 4A, FIG. 5B is an enlarged side view, partly in section, of an optical system of an optical pickup corresponding to FIG. 4B, and FIG. 5C is a bottom view of an optical pickup provided with a bottom side reproduction/recording head.

The illustration envisions a magneto-optical disc driver apparatus for applications wherein the magneto-optical disc recording media (magneto-optical disc media 22) are fixed type magneto-optical disc recording media such as for a hard disc driver (HDD) which are never removed from the turntable of the rotational member 23 having the shaft and turntable.

The two magneto-optical disc media 22, that is, the upper (or first) magneto-optical disc medium 22U and the lower (or second) magneto-optical disc medium 22L, are one-sided recording types with single recording sides. The protective sides of the upper magneto-optical disc medium 22U and the lower magneto-optical disc medium 22L are placed facing each other separated by a certain space so as to allow insertion of auxiliary magnetic field application magnets 29 used as the auxiliary magnetic field applying means. Namely, the recording sides of the disc media 22U and 22L are placed facing away from each other. The upper magneto-optical disc medium 22U and the lower magneto-optical disc medium 22L are affixed to a turntable of a rotational member 23 having a shaft and a turntable and are rotated by a spindle motor 24 connected to the shaft of the rotational member 23.

The magneto-optical disc recording apparatus is provided with four optical pickups. These optical pickups are provided with, for the upper magneto-optical disc medium 22U, a top side reproduction/recording head 25 and a top side reproduction/erasure head 26 in the same plane as the head 25 in the horizontal direction at a position facing it in the diametrical direction of the upper magneto-optical disc medium 22U and, for the lower magneto-optical disc medium 22L, a bottom side reproduction/recording head 27 and a bottom side reproduction/erasure head 28 in the same plane as the head 27 in the horizontal direction at a position facing it in the diametrical direction of the lower magneto-optical disc medium 22L.

In the illustration, the top side reproduction/recording head 25 and the bottom side reproduction/recording head 27 are disposed facing each other in the vertical direction across the magneto-optical disc media 22, while the top side reproduction/recording head 26 and the bottom side reproduction/recording head 28 are disposed facing each other in the vertical direction across the magneto-optical disc media 22.

Referring to FIG. 5A to FIG. 5C, an explanation will be made of an optical system of an optical pickup in which the top side reproduction/erasure head 26 and the bottom side reproduction/erasure head 28 are mounted, as shown in FIG. 4A.

The optical pickup is provided with a laser diode 31, collimater lens 32, grating 33, beam splitter 34, front automatic power control (APC) photodetector 35, objective lens 36, Wollaston prism 37, collimater lens 38, multilens 39, photodetector 40, and prism mirror In the illustrated configuration, the beam splitter has inside it a reflecting surface which bends the optical axis by 90°. The laser diode 31 and photodetector 40 are arranged in parallel. The deployment of the optical components differs from those of the above examples explained with reference to FIG. 1 to FIG. 3, but the functions are basically the same as those of the related art.

In the example of the configuration shown in FIG. 5A to FIG. 5C, further, provision is made of a single mirror and prism mirror 46 able to bend the optical axis 90° in the parallel luminous flux.

In the optical system of the optical pickup in this magneto-optical disc recording apparatus, the optical path shown below is established:

The laser light emitted from the laser diode 31 is collimated by the collimater lens 32 and passes through the grating 33 to be divided into three spots. Then, these are reflected in the beam splitter 34 and further are reflected by the prism mirror 46, are guided to the objective lens 36, and are emitted to the upper magneto-optical disc medium 22U or the lower magneto-optical disc medium 22L. Part of the laser light passes through the beam splitter 34 to head to the front APC photodetector 35. The signal detected by the front APC photodetector 35 is used for monitoring the output level of the laser diode 31. From the laser light focused on the recording side of the upper magneto-optical disc medium 22U or the lower magneto-optical disc medium 22L by the objective lens 36, it is possible to read the signal recorded on the upper magneto-optical disc medium 22U or lower magneto-optical disc medium 22L using the magnetic Kerr effect, that is, the effect where the deflection angle changes according to the direction of the vertical magnetic field caused by the auxiliary magnetic field application magnet 29. The application of the auxiliary magnetic field by the auxiliary magnetic field application magnets 29 will be explained in detail later with reference to FIG. 6 to FIG. 11.

The light returning from the upper magneto-optical disc medium 22U or the lower magneto-optical disc medium 22L becomes parallel light once again at the objective lens 36. It then passes through the beam splitter 34 and then is split into ordinary rays and extraordinary rays (P wave and S wave) by the Wollaston prism 37 and the magneto-optical signal is detected. The light is made parallel light again at the collimater lens 38, then passes through the multilens 39. Finally, the photodetector 40 detects the reproduction RF signal channel coded and recorded at the lower magneto-optical disc medium 22L.

The signal detected at the photodetector 40 is used for servo control in addition to signal detection. These operations will be explained in detail later.

Referring again to FIGS. 4A and 4B to explain, the optical pickup of the top side reproduction/erasure head 26, which is representative of the heads 25, 26, 27, and 28, this is slidable in the diametrical direction of the upper magneto-optical disc medium 22U and the lower magneto-optical disc medium 22L due to the bearings 8 and shaft 9 and is moved to a specific position in the track direction of the upper magneto-optical disc medium 22U and lower magneto-optical disc medium 22L by a coarse motion motor 10. The optical pickup and the sliding part and coarse motion motor 10 are affixed to a base 11 which in turn is disposed on the sled base 12.

The auxiliary magnetic field application magnet 29 as an auxiliary magnetic field applying means is inserted in the space between the upper magneto-optical disc medium 22U and the lower magneto-optical disc medium 22L.

Since the recording side of the upper magneto-optical disc medium 22U and the recording side of the lower magneto-optical disc medium 22L face outward, the direction of the auxiliary magnetic field with respect to the upper magneto-optical disc medium 22U and the direction of the auxiliary magnetic field with respect to the lower magneto-optical disc medium 22L become opposite. Therefore, by positioning the heads above and below the magneto-optical disc media 22 so that the recording heads and erasure heads face each other it is possible to make common use of a single auxiliary magnetic field applying means for two heads. In this illustration, to enable common use of a single auxiliary magnetic field application magnet 29, the auxiliary magnetic field application magnet 29 is inserted between the upper magneto-optical disc medium 22U and the lower magneto-optical disc medium 22L and the top side reproduction/recording head 25 and bottom side reproduction/recording head 27 are arranged facing each other across the two magneto-optical disc media 22 in the vertical direction.

Referring to FIG. 6 to FIG. 8, an explanation will be made of the application of an auxiliary magnetic field and the magnetic Kerr effect caused by the auxiliary magnetic field application magnet 29.

FIG. 6 is a perspective view illustrating the relationship between the auxiliary magnetic field application magnet 29 for the lower magneto-optical disc medium 22L and the bottom side reproduction/recording head 27 (optical pickup).

FIG. 7 is a cross-sectional view along the line A—A of FIG. 6.

FIG. 8 is a view of the configuration of the auxiliary magnetic field generating unit of FIG. 7.

FIG. 9 is a plane view of the auxiliary magnetic field generating unit shown in FIG. 8.

Figure 10:
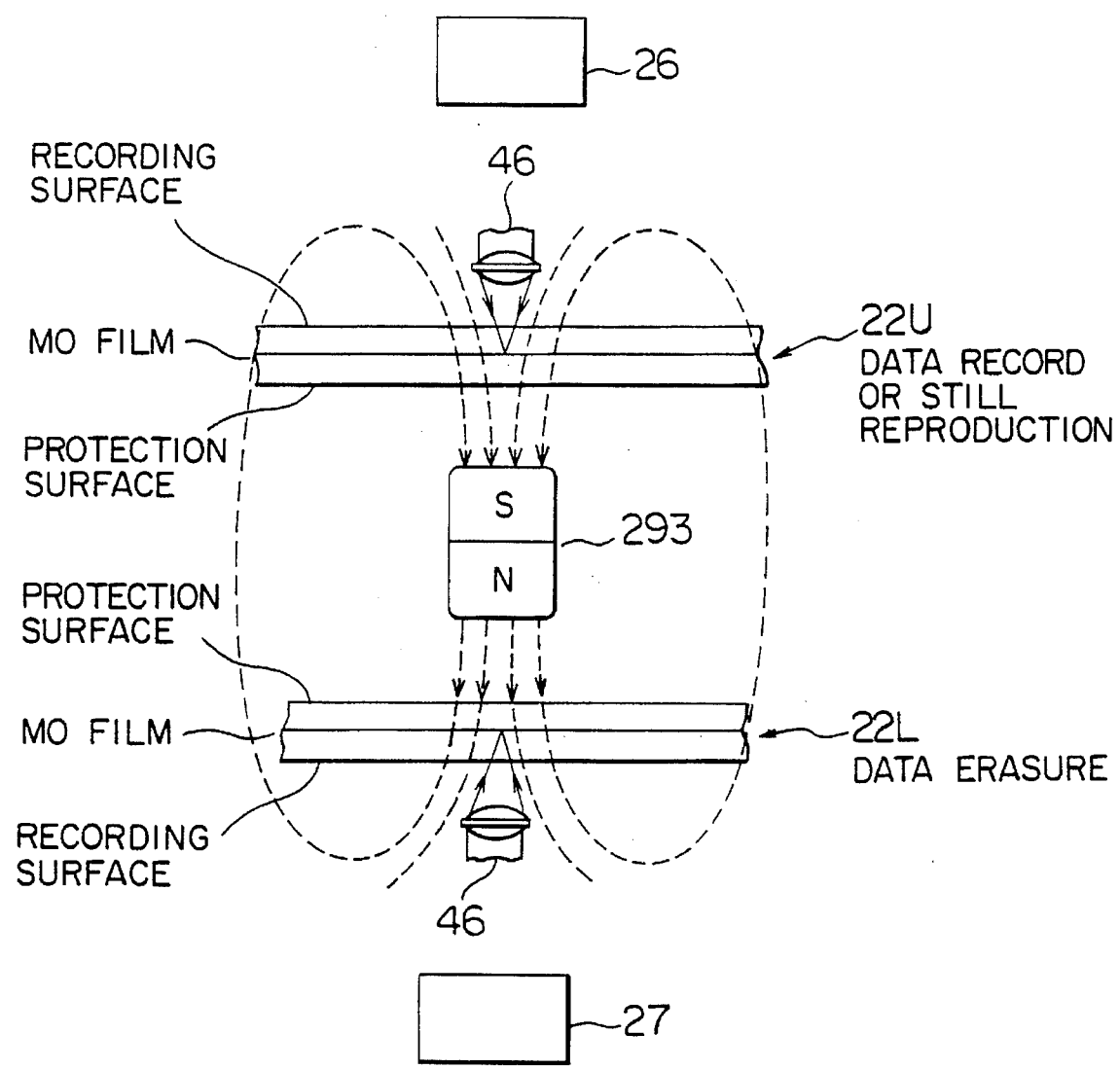
FIG. 10 is a view of the direction of the auxiliary magnetic field with respect to the upper magneto-optical disc medium and the lower magneto-optical disc medium caused by an auxiliary magnetic field application magnet.

FIG. 10 is a view of the direction of the auxiliary magnetic field at the time of erasure of data recorded on the lower magneto-optical disc medium 22L and the direction of the auxiliary magnetic field at the time of recording of data on the lower magneto-optical disc medium 22L and still reproduction.

As illustrated in FIG. 6 and FIG. 8, the auxiliary magnetic field application magnet 29 and the bottom reproduction/recording head 27 are disposed at positions facing each other across the lower magneto-optical disc medium 22L axially supported by the rotational member 23 having the shaft and turntable and rotated by the spindle motor 24. The two are attached to an affixing portion 56 provided on a chassis 42. The auxiliary magnetic field application magnet 29 is positioned at the protective side of the lower magneto-optical disc medium 22L and the bottom side reproduction/recording head 27 with the prism mirror 46 attached is positioned at the recording side. The moving portion 47 of the optical pickup is moved along a linear guide 50 by a sled linear motor 49.

As illustrated in FIG. 8 and FIG. 9, the auxiliary magnetic field application magnet 29 has an auxiliary magnetic field generating unit 291, a mounting plate 292, a permanent magnet 293, a bearing 294, a coil 295, a base plate 296, and a yoke 297.

The auxiliary magnetic field generating unit 291 is disposed above the lower magneto-optical disc medium 22L. At the center of the auxiliary magnetic field generating unit 291, the permanent magnet 293 is attached rotatably by the bearing 294 attached to the mounting plate 292. The permanent magnet 293 is magnetized so that the upper and lower sides of the center axis become the N-pole and S-pole. The auxiliary magnetic field generated here is applied to the lower magneto-optical disc medium 22L and the upper magneto-optical disc medium 22U. The top side reproduction/recording head 25 and the bottom side reproduction/erasure head 28 are used for recording or erasure of data, respectively.

The permanent magnet 293 is rotated by the magnetic field of the coil (electromagnet) 295 carried on the base plate 196 and is controlled so that either the S-pole or the N-pole is disposed facing the lower magneto-optical disc medium 22L. Normally, when erasing data from the lower magneto-optical disc medium 22L, the N-pole of the permanent magnet is positioned at the lower magneto-optical disc medium 22L side. When recording data, the S-pole of the permanent magnet 293 is positioned at the lower magneto-optical disc medium 22L.

The yoke 297 has its center portion 297A cut away so that the magnetic flux from the permanent magnet 293 to the upper magneto-optical disc medium 22U is not obstructed by the presence of the yoke 297.

If the polarities of the magneto-optical effect are reversed between the upper magneto-optical disc medium 22U and the lower magneto-optical disc medium 22L, then a single auxiliary magnetic field application magnet 29 can be shared by the top side reproduction/erasure head 26 and the bottom side reproduction/erasure head 27 and it is possible to position the top side reproduction/erasure head 26 and bottom side reproduction/recording head 27 at the same positions above and below the magneto-optical disc media 22 so that the recording and erasure heads face each other. More specifically, when using the bottom side reproduction/recording head 27 for erasing data recorded on the lower magneto-optical disc medium 22L and using the top side reproduction/erasure head 26 for recording data on the upper magneto-optical disc medium 22U, the directions of the magnetic flux become as illustrated in FIG. 10. Conversely, when the bottom side reproduction/recording head 27 is used for recording data on the lower magneto-optical disc medium 22L and the top side reproduction/erasure head 26 is used for erasing data recorded on the upper magneto-optical disc medium 22U, it is sufficient to reverse the direction of the permanent magnet 293 to reverse the direction of the magnetic poles of the permanent magnet 293 (direction of magnetic flux) from the positions of the magnetic poles shown in FIG. 7.

Further, when the polarities of the magneto-optical effect are made the same for the upper magneto-optical disc medium 22U and the lower magneto-optical disc medium 22L, when erasing data from the upper magneto-optical disc medium 22U by the top side reproduction/erasure head 26 and when recording data on the lower magneto-optical disc medium 22L by the bottom side reproduction/recording head 27, it is sufficient to rotate the permanent magnet 293 by the coil 295 to change the direction of the magnetic poles with respect to the upper magneto-optical disc medium 22U and the lower magneto-optical disc medium 22L.

Which direction, up or down, the S-pole or N-pole of the permanent magnet 293 face is detected using a Hall element 299.

Note that in the above mentioned configuration, the method is illustrated of changing the direction of the magnetic poles using the permanent magnet 293 and coil 295, but it is also possible to use as an auxiliary magnetic field applying means an electromagnet having the ability to apply a magnetic field equivalent to the permanent magnet 293 instead of the permanent magnet 293, eliminate the coil 295, and change the direction of the current flowing in the electromagnet.

When the spiral directions of the upper magneto-optical disc medium 22U and the lower magneto-optical disc medium 22L are the same, the feed directions of the optical pickups in the radial direction of the upper magneto-optical disc medium 22U become opposite. In this case, the actuators of the optical pickups above and below the magneto-optical disc media 22, for example, the optical pickup of the top side reproduction/recording head 25 and the optical pickup of the bottom side reproduction/erasure head 28, cannot be shared and independent actuators are required.

The configuration of the magneto-optical disc recording apparatus including a signal processing system of this case will be explained with reference to FIG. 11.

Figure 11:
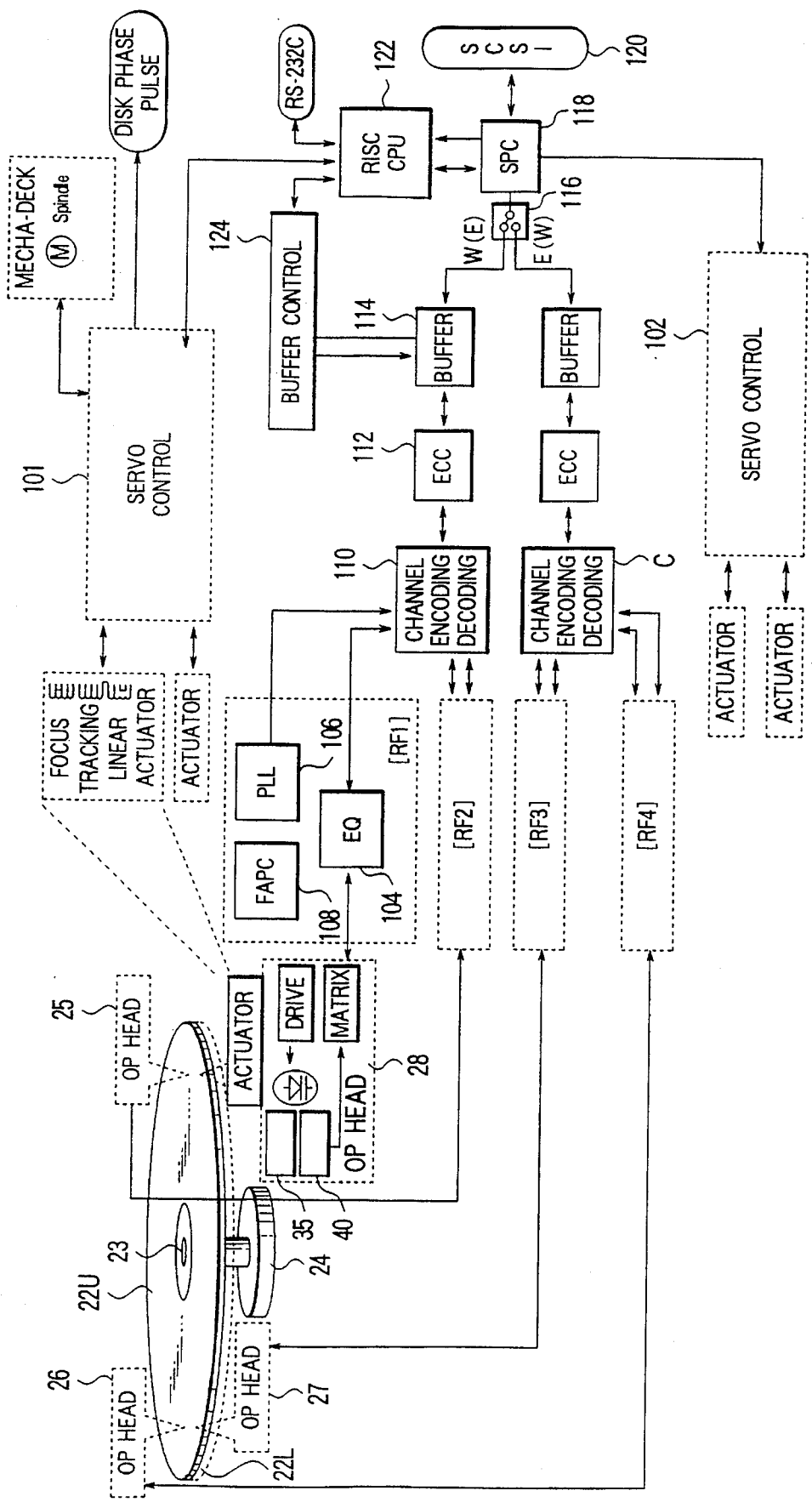
FIG. 11 is a view of the configuration of a magneto-optical disc recording apparatus including a signal processing system in the case of recording and reproduction using two-pair (or four-pair) heads.

FIG. 11 is a view of the configuration of a magneto-optical disc recording apparatus in the case of recording and reproduction using two-pair (or four-pair) heads. That is, in the magneto-optical disc recording apparatus, the top side reproduction/recording head 25, top side reproduction/erasure head 26, bottom side reproduction/recording head 27, and bottom side reproduction/erasure head 28 are independently driven and controlled by the later mentioned actuators.

The optical pickup of the top side reproduction/recording head 25 and the optical pickup of the top side reproduction/erasure head 26 are disposed above the upper magneto-optical disc medium 22U and the optical pickup of the bottom side reproduction/recording head 27 and optical pickup of the bottom reproduction/erasure head 28 are disposed below the lower magneto-optical disc medium 22L.

Below, an explanation will be made of the optical pickup of the bottom side reproduction/erasure head 28 as a representative example. The optical system explained with reference to FIGS. 5A to 5C, for example, comprising the laser diode 31, front APC photodetector 35, photodetector 40, and matrix circuit for processing the signal of this photodetector, is mounted on this optical pickup.

As the actuator, there are a focus actuator for controlling the focal position of the objective lens 36 by moving the optical pickup in the vertical direction, a tracking actuator for moving the optical pickup in the track direction of the upper magneto-optical disc medium 22U, and a linear actuator. These actuators are servo controlled by a first servo control circuit 101. Note that the first servo control circuit 101 performs servo control on the actuator for the top side reproduction/recording head 25 in addition to the actuator for the bottom reproduction/erasure head 28. A second servo control circuit 102 performs servo control on the actuator for the top side reproduction/erasure head 26 and the actuator for the bottom side reproduction/recording head 27.

The detection signal of the front APC photodetector 35 is input to the front APC circuit 108. The front APC circuit 108 performs output control on the laser diode 31.

The output signal of the photodetector 40, is processed by the matrix circuit equalized by an automatic equalization circuit (EQ) 104 and input to a first channel coding/decoding circuit 110. A channel clock signal reproduced by a phase-locked loop (PLL) circuit 104 is supplied to the channel coding/decoding circuit 110 as well. This channel clock signal is used to reproduce the data read out from the upper magneto-optical disc medium 22U through the photodetector 40. The reproduced data is subjected to error correction processing by an ECC circuit 112, then is output to the buffer circuit 114 where it is temporarily stored. The data stored in the buffer circuit 114 is input through a switching circuit 116 to an SPC circuit 118 and is sent through a small-computer small-interface (SCSI) 120 to a host computer (not shown). Alternatively, it is sent from the SPC circuit 118 to a reduced instruction set computer (RISC) 122 and is sent through an RS232C to another computer. The RISC 122 controls the first servo control circuit 101 and controls the input and output of the buffer circuit 114 through a buffer control circuit 124.

The other optical pickups also perform similar signal processing and control operations.

If the spiral directions of the upper magneto-optical disc medium 22U and lower magneto-optical disc medium 22L are reversed to be opposite to the above spiral directions, then it is possible to make the directions of feed in the radial direction of the magneto-optical disc medium 22 of the optical pickups the same. In this case, for example, the optical pickup of the top side reproduction/recording head 25 and the optical pickup of the bottom side reproduction/erasure head 28 can be driven by a common actuator.

Figure 12:
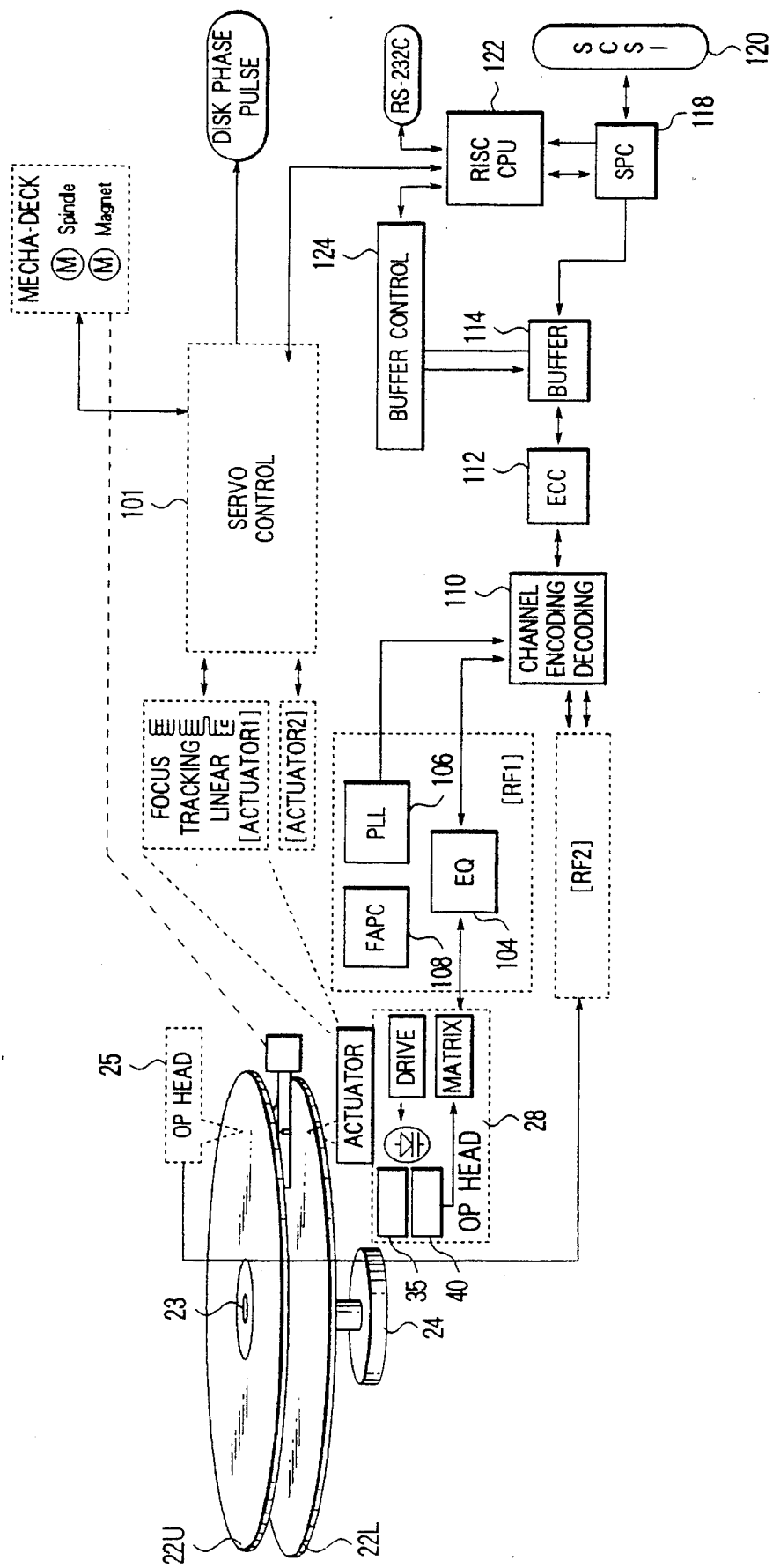
FIG. 12 is a view of the configuration of a magneto-optical disc recording apparatus including a signal processing system in the case of recording and reproduction using one pair of heads.

FIG. 12 is a view of the configuration of a magneto-optical disc recording apparatus in the case of recording and reproduction using such one-pair heads.

In the magneto-optical disc recording apparatus, the top side reproduction/recording head 25 and the bottom side reproduction/erasure head 28 are controlled in drive by the same actuator and the top side reproduction/erasure head 26 and the bottom side reproduction/recording head 27 are controlled in drive by the same actuator. Illustration of the actuator of the top side reproduction/erasure head 26 and bottom side reproduction/recording head 27 is omitted.

The optical pickup of the top side reproduction/recording head 25 is positioned above the upper magneto-optical disc medium 22U and the optical pickup of the bottom side reproduction/erasure head 28 is positioned below the lower magneto-optical disc medium 22L. A common actuator is provided for these optical pickups. As these actuator, in the same way as explained with reference to FIG. 8, there are a focus actuator for controlling the focal position of the objective lens 36 by moving the optical pickup in the vertical direction, a tracking actuator for moving the optical pickup in the track direction of the upper magneto-optical disc medium 22U, and a linear actuator. These actuators are servo controlled by the first servo control circuit 101. The second servo control circuit (not shown) performs servo control on the actuator for the optical pickups of the top side reproduction/erasure head 26 and bottom side reproduction/recording head 27.

The front APC control by the detection signal of the front APC photodetector 35 is the same as that explained with reference to FIG. 11.

The signal processing from the photodetector 40 is the same as that explained with reference to FIG. 11.

The same applies to the optical pickups of the top side reproduction/erasure head 26 and bottom side reproduction/erasure head 28.

Modification of First Embodiment

Two spindle motors 24 are prepared: a first spindle motor for rotating the upper magneto-optical disc medium 22U and a second spindle motor for rotating the lower magneto-optical disc medium 22L. By rotating the upper magneto-optical disc medium 22U and the lower magneto-optical disc medium 22L, whose spiral directions are the same, in opposite directions, it is possible to use two magneto-optical discs with the same spiral directions.

By making the magneto-optical disc recording apparatus the configuration illustrated in FIGS. 4A and 4B and the configuration explained above, that is, by placing the upper magneto-optical disc medium 22U and the lower magneto-optical disc medium 22L a predetermined distance apart with their protective sides facing each other, affixing them to a turntable of a rotational member 23 having a shaft and turntable, and disposing auxiliary magnetic field application magnets 29 in the space between the same, it is possible to use in common the optical systems explained with reference to FIGS. 5A to 5C and the auxiliary magnetic field applying means explained with reference to FIGS. 6 to 10 for the separate optical pickups above and below the magneto-optical disc media 22, possible to reduce the size of the sled base 12 by having the sled structure also make common use of the bases 11 for supporting the same, and possible to make the magneto-optical disc recording apparatus simple in overall construction.

Figure 1:
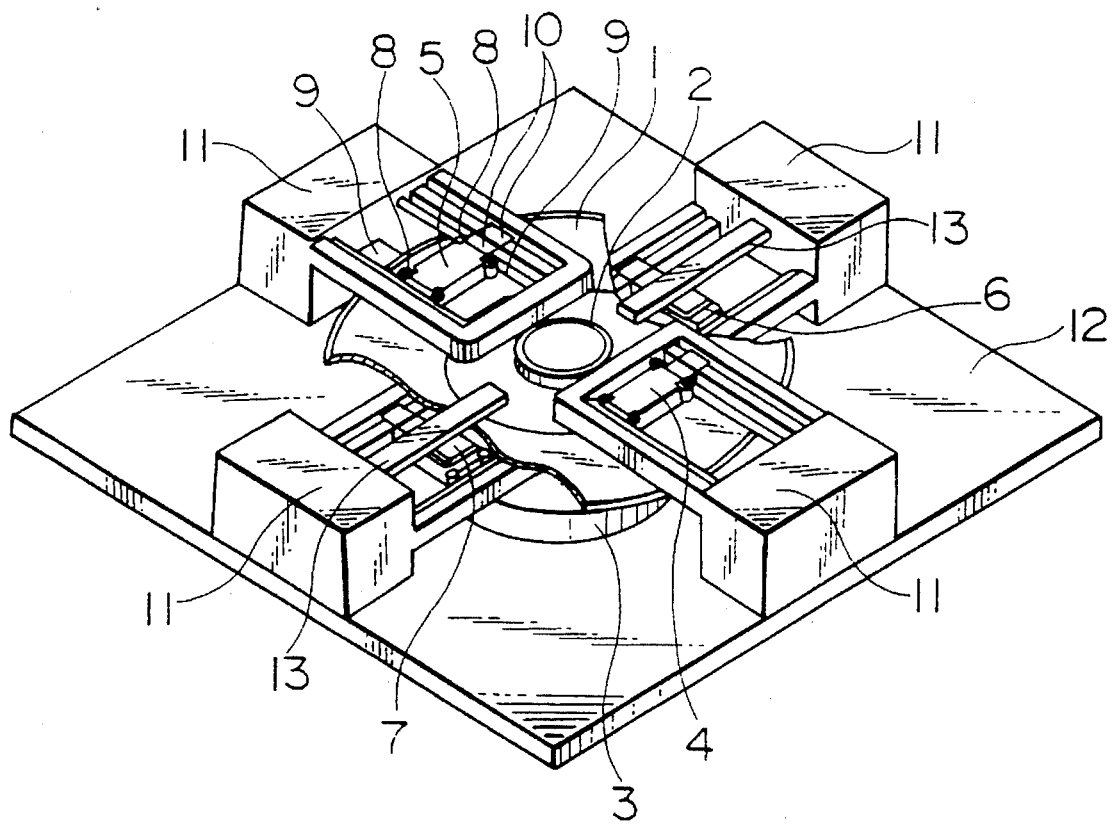
FIG. 1 iS a perspective view of a first example of a magneto-optical disc recording apparatus.
Figure 2:
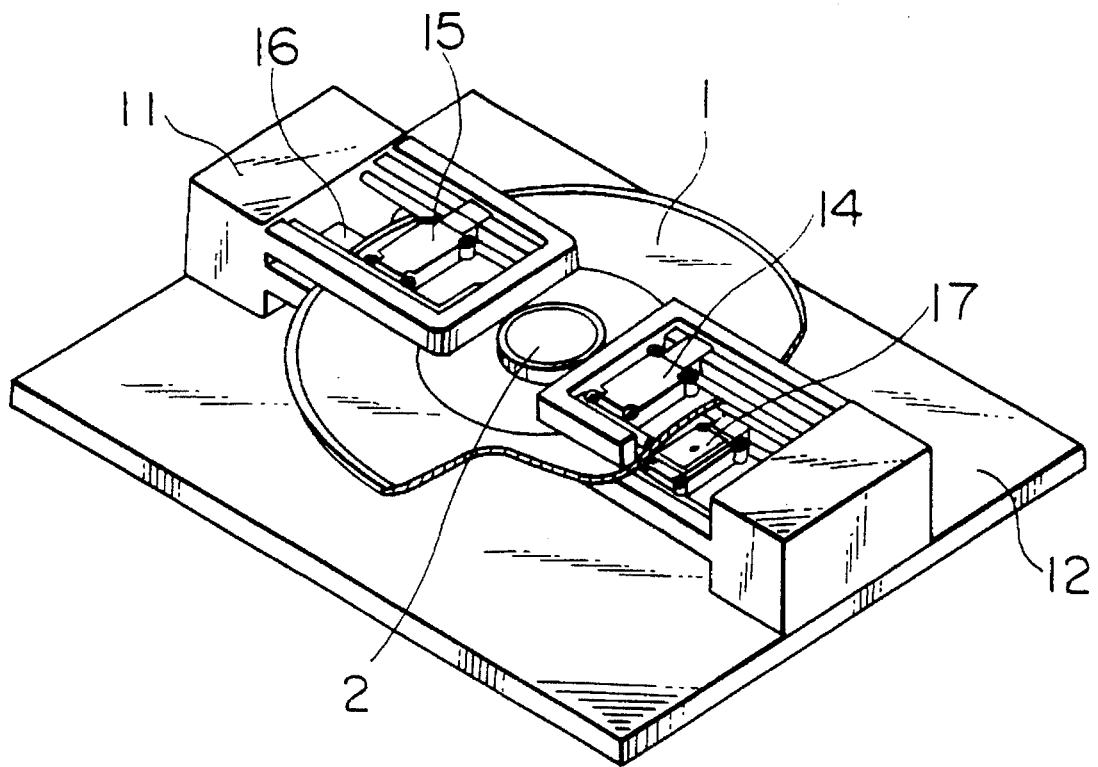
FIG. 2 is a perspective view of a second example of a magneto-optical disc recording apparatus.

In particular, since it is possible for an auxiliary magnetic field application magnet 29 to be used in common for the optical pickups of the two magneto-optical disc media 22, four optical pickups can be provided at two locations facing each other in the diametrical direction of the magneto-optical disc media 22, i.e., there is no need to provide optical pickups at four locations as shown in FIG. 1. In other words, referring to FIG. 13, as explained as the second embodiment, it is possible to provide other optical pickups at the empty regions of the magneto-optical disc recording apparatus of FIG. 4A. That is, according to the present invention, it is possible to provide a larger number of optical pickups.

Second Embodiment

Next, a second embodiment of the magneto-optical disc recording apparatus of the present invention will be explained with reference to FIG. 13.

Figure 13:
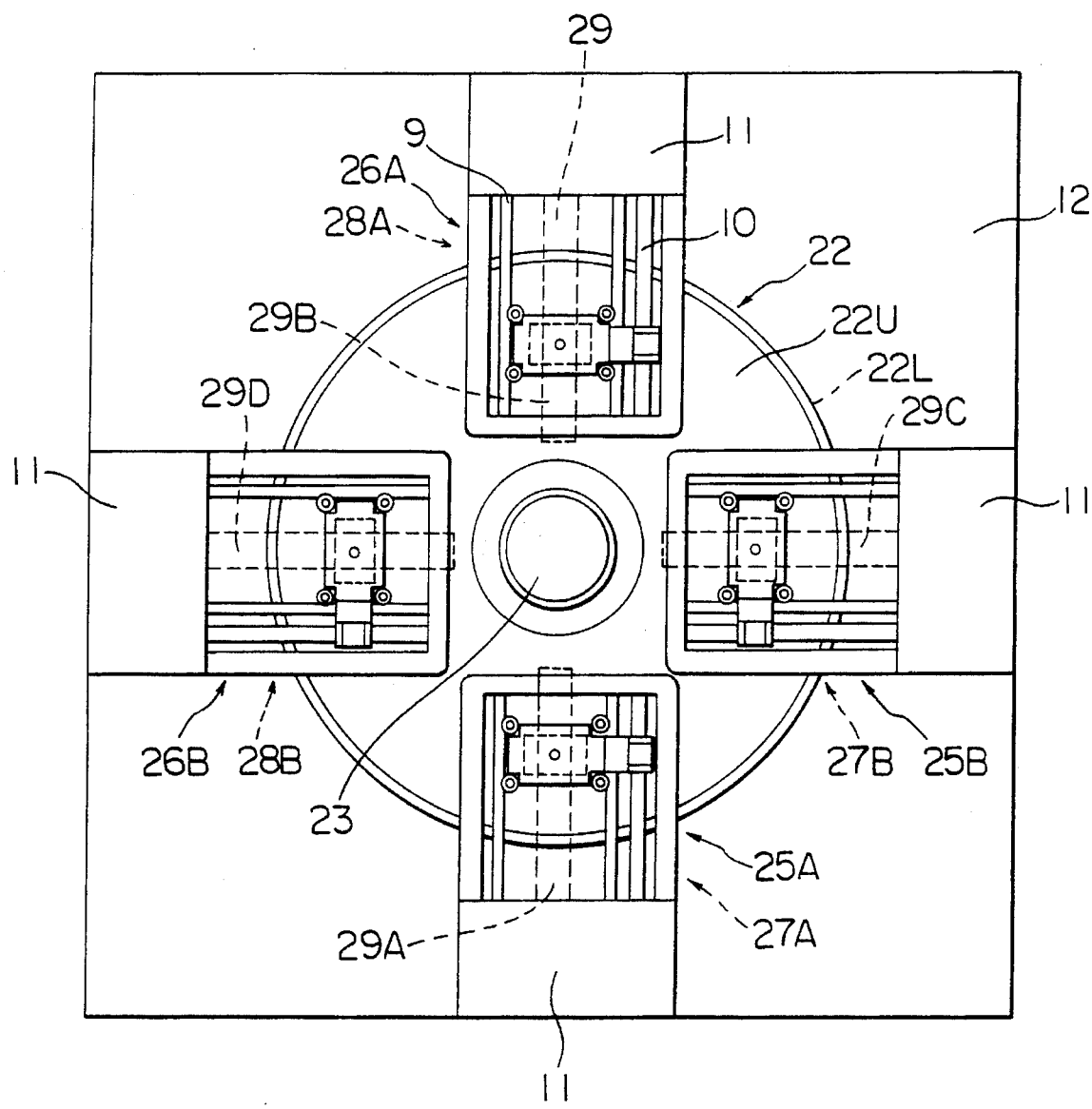
FIG. 13 is a plane view of a second embodiment of the magneto-optical disc recording apparatus of the present invention.

The magneto-optical disc recording apparatus of the second embodiment illustrated in FIG. 13 uses two single sided magneto-optical disc media affixed to a turntable of a rotational member 23 having a shaft and a turntable, that is, an upper magneto-optical disc medium 22U and a lower magneto-optical disc medium 22L. The magneto-optical disc media 22 are used independently divided into an inner circumference and outer circumference area. That is, the optical pickups are made for the top side, so above the upper magneto-optical disc medium 22U, provision is made of a top side inner circumference reproduction/recording head 25A and top side inner circumference reproduction/erasure head 26A at a position facing the top side inner circumference reproduction/recording head 25A in the diametrical direction and provision is made, between the heads 25A and 26A, of the top side outer circumference reproduction/recording head 25B and the top side outer circumference reproduction/erasure head 26B facing each other in the diametrical direction of the magneto-optical disc media 22. In the same way, below the lower magneto-optical disc medium 22L, provision is made, at 90 degree intervals, of a bottom side inner circumference reproduction/recording head 27A and bottom side inner circumference reproduction/erasure head 28A at a position facing the bottom side inner circumference reproduction/recording head 27A in the diametrical direction and provision is made, between the heads 27A and 28A, of the bottom side outer circumference reproduction/recording head 27B and the bottom side outer circumference reproduction/erasure head 28B facing each other in the diametrical direction of the magneto-optical disc media 22.

That is, the top side inner circumference reproduction/recording head 25A and bottom side inner circumference reproduction/recording head 27A, the top side outer circumference reproduction/recording head 25B and bottom side outer circumference reproduction/recording head 27B, the top side inner circumference reproduction/erasure head 26A and bottom side inner circumference reproduction/erasure head 28A, the top side outer circumference reproduction/erasure head 26B and bottom side inner circumference reproduction/erasure head 28A, and the top side outer circumference reproduction/erasure head 26B and bottom side outer circumference reproduction/erasure head 28B are disposed facing each other above and below the magneto-optical disc media 22. In the space between the upper magneto-optical disc medium 22U and the lower magneto-optical disc medium 22L facing each other in the vertical direction, there are provided four auxiliary magnetic field application magnets 29A, 29B, 29C, and 29D in common for the upper and lower optical pickups.

Depending on whether or not the spiral direction of the upper magneto-optical disc medium 22U and the spiral direction of the lower magneto-optical disc medium 22L are made the same or not, as explained with reference to FIG. 8 and FIG. 9, it is possible to apply the actuators in common or independently for the upper and lower optical pickups.

Figure 3:
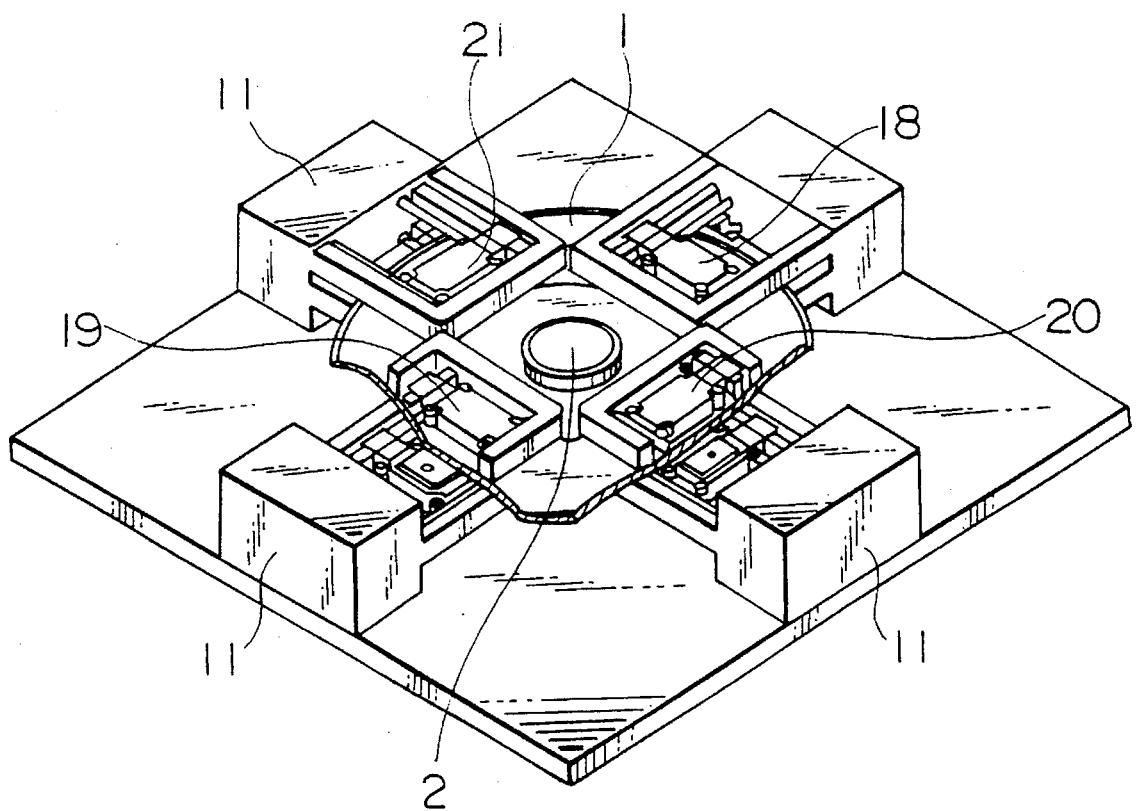
FIG. 3 iS a perspective view, with portions broken away and in section, of a third example of a magneto-optical disc recording apparatus.

Compared with the above mentioned example of the magneto-optical disc recording apparatus explained with reference to FIG. 3, in the present invention, as explained in the first embodiment, the upper magneto-optical disc medium 22U and lower magneto-optical disc medium 22L are placed with their protective sides facing each other and a space for providing an auxiliary magnetic field application magnet 29 is formed between them, so it is possible to provide a total of eight optical pickups, that is, four optical pickups above the upper magneto-optical disc medium 22U and four optical pickups below the lower magneto-optical disc medium 22L.

The magneto-optical disc recording apparatus of the second embodiment, compared with the magneto-optical disc recording apparatus of the first embodiment, is provided with two times the number of optical pickups. These can operate independently, so it is possible to cut by a half the access time to the magneto-optical disc media 22 and possible to increase the rate of transfer by as much as 2 times compared with the magneto-optical disc recording apparatus of the first embodiment.

In this case, if the two reproduction/recording heads and reproduction/erasure heads are disposed at each side of the upper magneto-optical disc medium 22U and lower magneto-optical disc medium 22L at 90 degree intervals from the other sets, then it is possible to realize optical pickups with independent optical systems and auxiliary magnetic field applying means with less restrictions in mounting.

In the above embodiments, the explanation was made of the case of a magneto-optical disc recording apparatus of the optical modulation type as a preferred embodiment of the magneto-optical disc recording apparatus of the present invention, of use of magneto-optical disc recording media of the non-overwrite type, and provision of the erasure heads and recording heads separately so as to maintain a processing speed equal to that of a magneto-optical disc recording apparatus of the overwrite type, but in the present invention basically there is no need to provide the erasure heads and recording heads separately. The recording speed falls compared with the above embodiments, but it is possible to reduce the size of the apparatus from the above.

In the above embodiments, the explanation was made that the recording head differs from the erasure head, but, apparently, the structures of the both heads are same, and accordingly, the recording head and the erasure head are switchable.

Further, the present invention is applicable not only the optical modulation type magneto-optical disc apparatus but also the magnetic-field modulation type magneto-optical disc apparatus.

As explained above, according to the present invention, by disposing the two upper and lower magneto-optical disc recording media, formed with recording sides on only one sides therefore, so their protective sides face each other, disposing an auxiliary magnetic field applying means in the space formed between them, and disposing the optical pickups at the outsides of the same at the same positions above and below the magneto-optical disc recording media, it is possible for the auxiliary magnetic field created by a single auxiliary magnetic field applying means to be made common use of by the upper and lower magneto-optical disc recording media and so the number of auxiliary magnetic field applying means used is halved. Further, the area occupied by the optical pickups is halved. As a result, according to the present invention, the mounting efficiency can be increased and the magneto-optical disc recording apparatus can be made smaller in size.

Further, according to the present invention, even in a type with independent optical systems and auxiliary magnetic field applying means, by disposing these at the same positions above and below the magneto-optical disc recording media, it is possible to dispose the optical pickups mountable at one side of the magneto-optical disc recording media at 90 degree intervals within limitation by the mounting area of the auxiliary magnetic field applying means. That is, it is possible to increase the number of the optical pickups (or heads) and possible to shorten the access time.

Further, in the present invention, by reversing the polarities of the magneto-optical effect between the two upper and lower magneto-optical disc recording media, it is possible to position the recording heads and the erasure heads facing each other at the same positions across the upper and lower magneto-optical disc recording media.

Further, in the present invention, the direction of the auxiliary magnetic field caused by the auxiliary magnetic field applying means becomes opposite for the two upper and lower magneto-optical disc recording media, so by positioning the recording heads and the erasure heads provided at the optical pickups to face each other across the upper and lower magneto-optical disc recording media, it is possible for two optical pickups at the top and bottom to share a single auxiliary magnetic field applying means.

While the invention has been described by reference to the specific embodiments chosen for purposes of illustration, it should be apparent that numerous modifications could be made thereto by those skilled in the art without departing from the basic concept and scope of the invention.

What is claimed is:

1. A magneto-optical disc recording and reproducing apparatus comprising:

a rotational member which is driven to rotate by a motor;

first and second non-overwrite magneto-optical disc recording media each having a recording area side and which are affixed to said rotational member a predetermined distance apart along the axial direction of said rotational member with the recording area sides facing away from each other;

a first magnetic field applying means disposed between the first and second magneto-optical disc recording media for applying a magnetic field of a first polarity to the first magneto-optical disc recording medium and for applying a magnetic field of an opposite, second polarity to the second magneto-optical disc recording medium;

a second magnetic field applying means disposed between the first and second magneto-optical disc recording media for applying a magnetic field of the second polarity to the first magneto-optical disc recording medium and for applying a magnetic field of the first polarity to the second magneto-optical disc recording medium;

a first optical pickup provided at a position facing the recording area side of the first magneto-optical disc recording medium, and aligned with the first magnetic field applying means on the opposite side of the first magneto-optical recording medium, for erasing data recorded on the first magneto-optical recording medium;

a second optical pickup provided at a position facing the recording area side of the second magneto-optical disc recording medium, and aligned with the first magnetic field applying means on the opposite side of the second magneto-optical recording medium, for recording data on the second magneto-optical recording medium;

a third optical pickup provided at a position facing the recording area side of the first magneto-optical disc recording medium, and aligned with the second magnetic field applying means on the opposite side of the first magneto-optical recording medium, for recording data on the first magneto-optical recording medium;

a fourth optical pickup provided at a position facing the recording area side of the second magneto-optical disc recording medium, and aligned with the second magnetic field applying means on the opposite side of the second magneto-optical recording medium, for erasing recorded data on the second magneto-optical recording medium.

2. A magneto-optical disc recording apparatus as set forth in claim 1, further comprising a means for reversing the direction of said magnetic field of said first and second magnetic field applying means.

3. A magneto-optical disc recording apparatus as set forth in claim 1, wherein said first and second magnetic field applying means are provided at positions 180 degrees apart in the diametrical direction of the magneto-optical disc recording medium;

said first and third optical pickups are provided at positions 180 degrees apart in the diametrical direction of the first magneto-optical disc recording medium; and said second and fourth optical pickups are provided at positions 180 degrees apart in the diametrical direction of the second magneto-optical disc recording medium.

4. A magneto-optical disc recording and reproducing apparatus comprising:

a motor driven rotational member;

a first non-overwrite magneto-optical disc recording medium and a second non-overwrite magneto-optical disc recording medium, each having a recording area side, which are affixed to the rotational member a predetermined distance apart along the axial direction of the rotational member with the recording area sides facing away from each other;

a first magnetic field applying means disposed between the first magneto-optical disc recording medium and the second magneto-optical disc recording medium for applying a magnetic field of a first polarity to the first magneto-optical disc recording medium and for applying a magnetic field of an opposite, second polarity to the second magneto-optical disc recording medium;

a second magnetic field applying means disposed between the first magneto-optical disc recording medium and the second magneto-optical disc recording medium for applying a magnetic field of the second polarity to the first magneto-optical disc recording medium and for applying a magnetic field of the first polarity to the second magneto-optical disc recording medium;

a first optical pickup provided at a position facing the recording area side of the first magneto-optical disc recording medium, and aligned with the first magnetic field applying means on the opposite side of the first magneto-optical recording medium, for erasing data recorded on the first magneto-optical recording medium;

a second optical pickup provided at a position facing the recording area side of the second magneto-optical disc recording medium, and aligned with the first magnetic field applying means on the opposite side of the second magneto-optical recording medium, for recording data on the second magneto-optical recording medium;

a third optical pickup provided at a position diametrically opposite to the first optical pickup, facing the recording area side of the first magneto-optical disc recording medium, and aligned with the second magnetic field applying means on the opposite side of the first magneto-optical recording medium, for recording data on the first magneto-optical recording medium while the first optical pickup is erasing recorded data from the first magneto-optical disc recording medium;

a fourth optical pickup provided at a position diametrically opposite to the second optical pickup, facing the recording area side of the second magneto-optical disc recording medium, and aligned with the second magnetic field applying means on the opposite side of the second magneto-optical recording medium, for erasing recorded data on the second magneto-optical recording medium.

5. A magneto-optical disc recording apparatus as set forth in claim 4, wherein the first magnetic field applying means and the second magnetic field applying means each include rotatably mounted permanent magnets and further comprising an electromagnetic means for reversing the directions of the magnetic fields of the first magnetic field applying means and the second magnetic field applying means by rotating the permanent magnets in preparation for erasing recorded data.

* * * * *